United States Patent [19]

Hattori et al.

[11] Patent Number: 4,550,367

[45] Date of Patent: Oct. 29, 1985

[54] DATA PROCESSING SYSTEM HAVING HIERARCHICAL MEMORIES

[75] Inventors: Akira Hattori, Yokohama; Takamitsu Tsuchimoto, Kawasaki, both of Japan

[73] Assignee: Fujitsu Limited, Kawasaki, Japan

[21] Appl. No.: 245,646

[22] PCT Filed: Jul. 24, 1980

[86] PCT No.: PCT/JP80/00169

§ 371 Date: Mar. 25, 1981

§ 102(e) Date: Mar. 20, 1981

[87] PCT Pub. No.: WO81/00321

PCT Pub. Date: Feb. 5, 1981

[30] Foreign Application Priority Data

Jul. 25, 1979 [JP] Japan .................. 54-94512

[51] Int. Cl.⁴ .................. G06F 9/00; G06F 7/00
[52] U.S. Cl. .................. 364/200
[58] Field of Search .................. 364/200, 900

[56] References Cited

U.S. PATENT DOCUMENTS

| | | | |
|---|---|---|---|
| 3,840,863 | 10/1974 | Fuqua et al. | 364/200 |
| 4,056,845 | 11/1977 | Churchill, Jr. | 364/200 |
| 4,156,278 | 5/1979 | Wilhite | 364/200 |
| 4,228,496 | 10/1980 | Katzman et al. | 364/200 |
| 4,356,550 | 10/1982 | Katzman et al. | 364/200 |

OTHER PUBLICATIONS

Computer Group News, vol. 2, No. 8, Mar. 1969, pp. 9-13, New York, US, C. J. Conti: "Concepts for Buffer Storage".

Computer Design, vol. 10, No. 1, Jan. 1971, pp. 87-93, Concord, US, R. M. Meade: "Design Approaches for Cache Memory Control".

Supplementary European Search Report, Appl. No. EP 80 90 1416, The Hague, Compl. Date 2/23/84, Examiner, Ledrut, P.

The Tandem 16: A Fault Tolerant Computing System, ©1977, Tandem Computers Cupertino California.

Primary Examiner—Gareth D. Shaw
Assistant Examiner—John G. Mills
Attorney, Agent, or Firm—Staas & Halsey

[57] ABSTRACT

A data processing system having hierarchical memories comprised of buffer memories contained in a plurality of central processing units, an intermediate buffer memory and a main memory having a plurality of banks. The intermediate buffer memory and the main memory are controlled under both a swap control method and a set associative control method. These two memories are accessed by address information which includes both bank-selection address bits and set-selection address bits. The bank-selection address bits are partially modified by part of the set-selection address bits.

8 Claims, 12 Drawing Figures

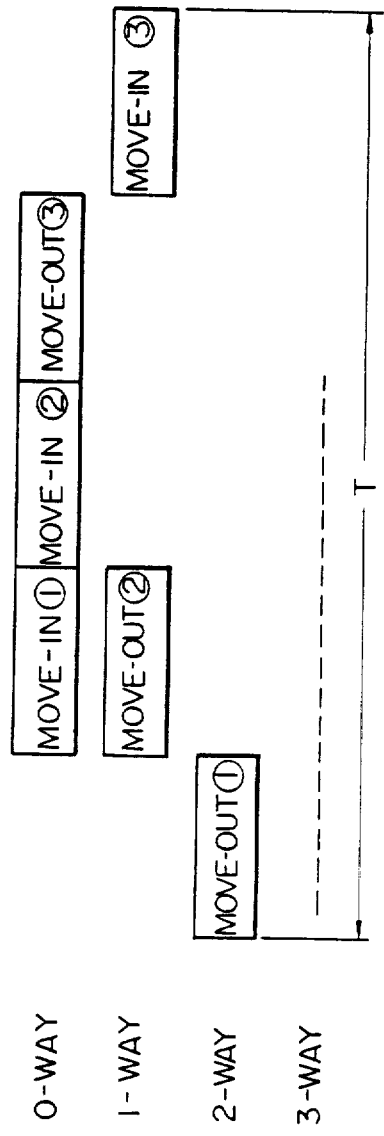

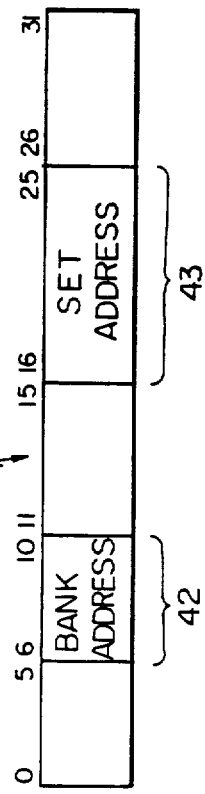
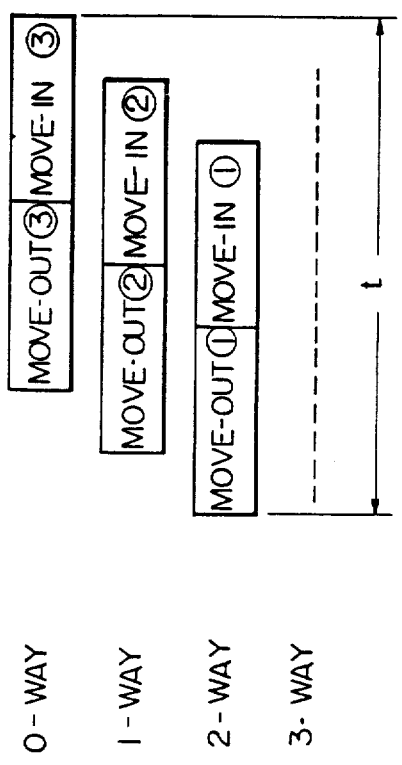
Fig. 3B
0-WAY
1-WAY
2-WAY
3-WAY
Fig. 4

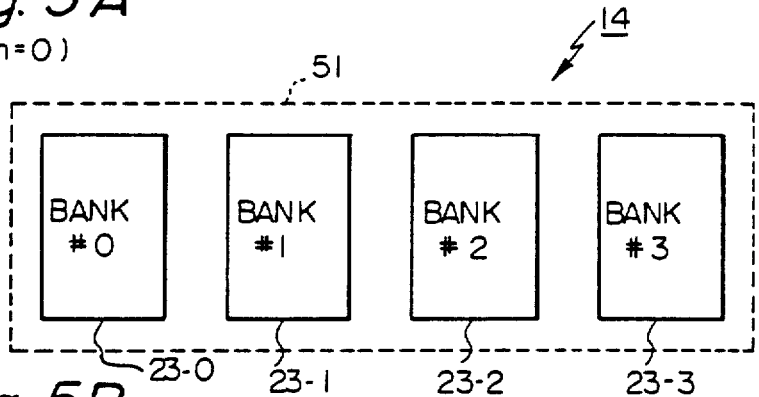
Fig. 5A (m=0)
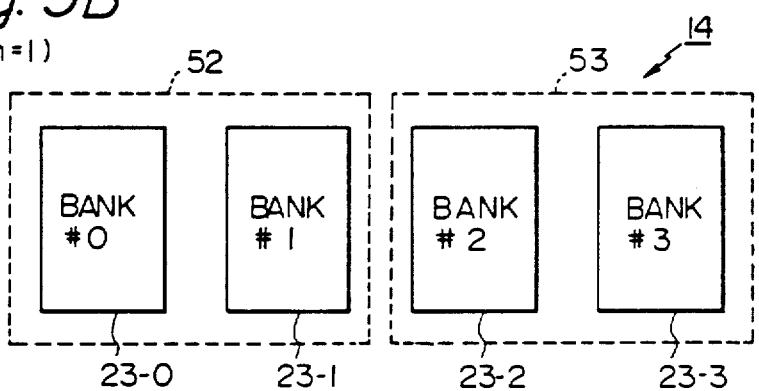
Fig. 5B (m=1)
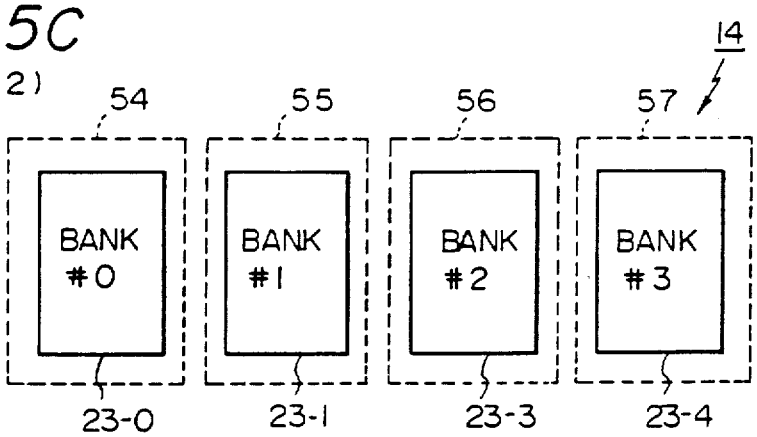
Fig. 5C (m=2)

DATA PROCESSING SYSTEM HAVING HIERARCHICAL MEMORIES

BACKGROUND OF THE INVENTION

The present invention relates to a data processing system having hierarchial memories, such as buffer memories of a plurality of central processing units, a main memory which cooperates with the central processing units, an intermediate buffer memory located between the central processing units and the main memory. More particularly the present invention relates to a system in which so-called move-in and move-out operations are achieved, between the intermediate buffer memory and the main memory, under a so-called swap control method, and, further, both the intermediate buffer memory and the main memory are controlled by a so-called set associative method, and, furthermore, the main memory itself is accessed under a so-called interleave control method.

Generally, in a large capacity memory, the main memory comprises of a plurality of memory apparatuses. Each of these memory apparatuses is called a bank or memory bank. A head address for a desired one of the banks is usually specified by one or more of the upper bits of address information. For example, if there are four banks in the main memory, the head address of the desired bank can be specified by two bits ($4=2^2$) of the address information. Thus, one of the desired banks can be selected by using the upper bits of the address information.

On the other hand, in the above mentioned data processing system, since both the intermediate buffer memory and the main memory are controlled by the set associative method, it is necessary for the address information to specify one desired data set to be accessed by one of the central processing units. Usually, the set can be specified by so-called set address bits, other than one or more of said upper bits, which are contained in the address information.

As mentioned above, the desired data set to be accessed is specified by the address information, and said move-in and move-out operations are achieved by using the address information, in order to realize a swapping of data between the intermediate buffer memory and a main memory. In this case, it should be noted that the memory bank which stores data to be read, through the move-in operation from the main memory to the intermediate buffer memory, it not always the same as the bank which stores data to be written, through the move-out operation from the intermediate buffer memory to the main memory. If the bank in which the move-in operation is conducted, is always the same as the bank in which the move-out operation has been conducted during one step for executing a certain program, the process for achieving the management of the main memory will be simplified, and the operating speed of the main memory will be increased. However, in the usual data processing system having hierarchical memories, it is difficult to simplify the above mentioned process used for achieving the management of the main memory, and also, the operating speed of the main memory cannot be increased. This is because, as previously mentioned, since a requirement, during a step, for occupying or using the memory bank often coincides with a requirement, during another step, for occupying the same bank, it is necessary to introduce a particular protocol in the system, by which protocol traffic control between these conflicting steps is performed.

SUMMARY OF THE INVENTION

An object of the present invention is, therefore, to provide a data processing system having hierarchical memories in which a memory bank for conducting the move-in operation can be always the same as a memory bank for conducting the corresponding move-out operation, and accordingly, it is possible to simplify the process for achieving the management of the main memory and the operating speed of the main memory can also be increased.

According to the present invention, there is provided a data processing system having hierarchical memories, with respect to address information, address bits which are contained in the address information and used for specifying one of the desired memory banks, are set up so as to partially incorporate therein a part of the address bits which are contained in the same address information and which used for specifying one of the sets defined by the data set associative method.

BRIEF DESCRIPTION OF THE DRAWINGS

FIG. 3A depicts timing charts used for explaining the sequence in the prior art used for conducting successive pairs of move-out and move-in operations;

FIG. 3B depicts timing charts used for explaining the sequence in the present invention used for conducting successive pairs of move-out and move-in operations;

FIG. 4 depicts a conventional data format for address information;

FIGS. 5A, 5B and 5C illustrate a main memory 14 of FIG. 2 which is construed in the $2^0$-pathway, the $2^1$-pathway and the $2^2$-pathway interleave modes, respectively;

DESCRIPTION OF THE PREFERRED EMBODIMENTS

The present invention will become more apparent from the detailed description of the preferred embodiments presented below, with reference to the accompanying drawings.

Figure 1:
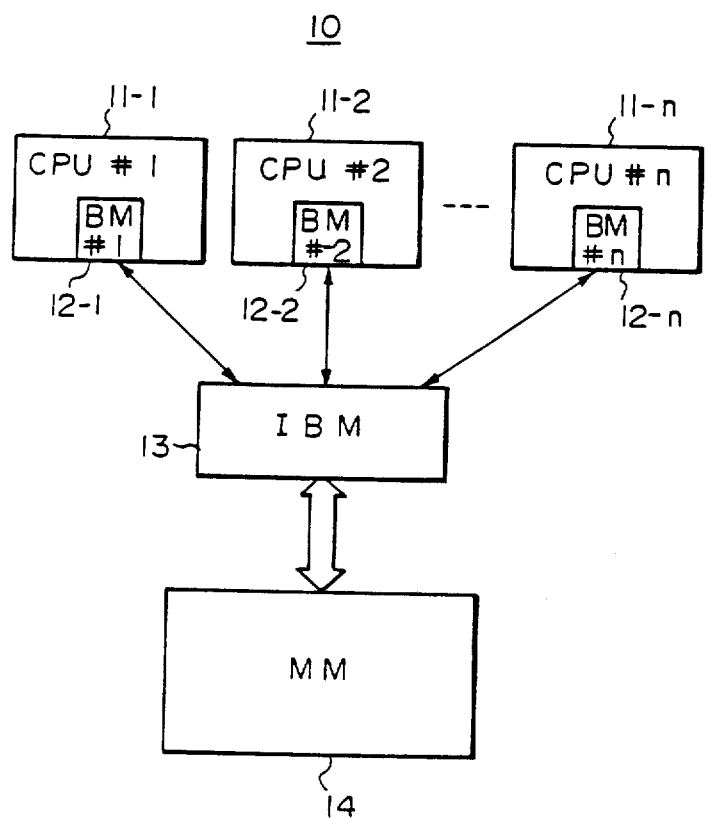
FIG. 1 illustrates a conventional data processing system having hierarchical memories to which the present invention is applied.

Referring to FIG. 1, which illustrates a conventional data processing system having hierarchical memories to which the present invention is applied, and includes a system 10 comprising: a plurality of central processing units (CPU#1, CPU#2, . . . , CPU#n) 11-1, 11-2, . . . , 11-n, buffer memories (BM#1, BM#2, . . . , BM#n) 12-1, 12-2, . . . , 12-n employed in respective central processing units 11-1, 11-2, . . . , 11-n; an intermediate buffer memory 13; and a main memory 14. The main memory 14 cooperates with each of the central processing units (11-1, 11:2, . . . , 11-n) via the intermediate buffer memory 13 and respective buffer memories 12-1, 12-2, . . . , 12-n. In the system 10, the present invention is particularly applied to both of the memories 13 and 14. Generally, the main memory 14 is a very large capacity memory, however, the main memory 14 has a shortcoming in that access time is long, and accordingly high speed accessing operations cannot be expected. Therefore, the intermediate buffer memory 13 is usually introduced between the main memory 14 and the central processing units 11-1 through 11-n so as to overcome the above mentioned short-coming of the main memory 14.

In the system 10, the intermediate buffer memory 13 and the main memory 14 are controlled by the set associative method. As is widely known, according to the set associative method, the memory area of the intermediate buffer memory 13 is divided into a plurality of sets. Each of the sets is comprised of a plurality of data blocks. The memory area of the main memory 14 is also divided into the same number of identical sets. In this case, each data communication between the memories 13 and 14 is carried out only between a certain one of the sets in the memory 13 and a corresponding one of the sets in the memory 14, so that achieving management of the memories 13 and 14 can be very simplified. However, it should be noted that the above mentioned sets are not physically existing objects, but are logically or imaginary existing objects. The general concept of "set associative" may be clarified with reference to, for example, an article in the magazine "Computer Group News", published on Mar. 9, 1969 in the U.S.A., entitled "Concepts for Buffer Storage". Further, the memories 13 and 14 are controlled under a swap control method. As is widely known, according to the swap control method, if data to be accessed by the central processing unit is found in the intermediate memory 13, the central processing unit executes a specified step using the data found in the memory 13. On the contrary, if data to be accessed is not found in the intermediate memory 13, the corresponding data block is read from the main memory 14 in to the intermediate buffer memory 13 via a move-in operation. However, since the memory 13 is always full of data blocks, one of the data blocks must be written from the memory 13 into the memory 14 via a move-out operation so as to create memory space in the intermediate buffer memory 13 for accomodating the needed data block which is to be moved-in from the main memory 14. However, if the contents of the data block to be moved-out have not been changed by one of the processing units (11-1 through 11-n), this data block is not moved-out to the memory 14, but is erased. This erasure is possible because the same data block is still stored in the memory 14. However, if the contents of the data block to be moved-out have been changed by one of the processing units (11-1 through 11-n), this data block must be moved-out to the main memory 14, so as to rewrite or up date the content of the corresponding data block of the memory 14. Whether or not the contents of the data blocks in the intermediate buffer memory 13 have been changed, is detected by referring to a corresponding change bit contained in a so-called TAG memory which is located adjacent to the intermediate buffer memory 13. Details of the TAG memory may be seen in, for example, an article in the magazine "Computer Design", published in January, 1971, in the U.S.A., entitled "Design Approaches for Cash Memory Control" and also other articles in the previously recited magazine.

Furthermore, in the system 10, the main memory 14 is accessed under an interleave control method. As is widely known, the interleave control method is very useful for increasing the main accessing speed of the memory 14 when the memory area thereof is divided into a plurality of independent memory banks. It should be noted that, although the above mentioned sets are logical or imaginary objects, the banks are physically existing objects which exist as, for example, printed circuit boards. It should further be noted that, usually, there is no relationship between the sets and the banks. According to the interleave control method, it is possible to drive or access one bank while executing one step and, simultaneously, to drive or access another bank while executing another step, and thereby, high speed accessing can be obtained therein.

Figure 2:
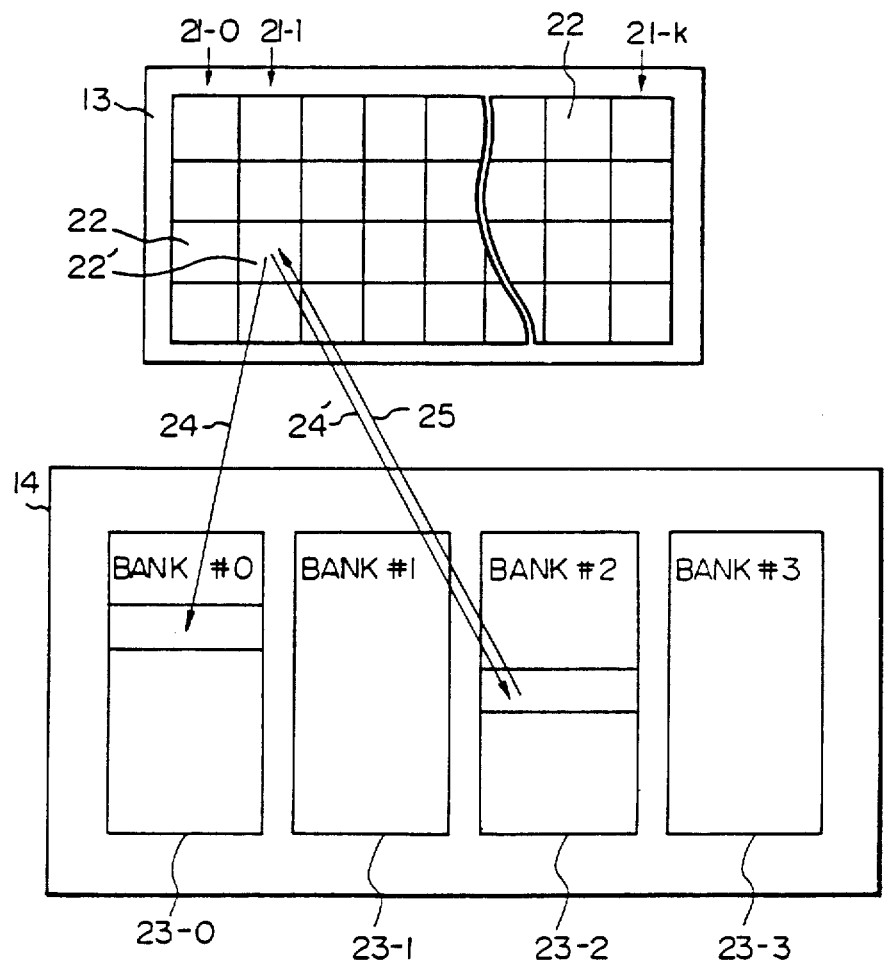
FIG. 2 illustrates one example of the construction of the two memories 13 and 14 illustrated in FIG. 1.

FIG. 2 illustrates one example of a construction of both the memories 13 and 14 shown in FIG. 1. In FIG. 2, the intermediate buffer memory 13 comprises a plurality of the data sets 21-0, 21-1, . . . , 21-k. Each set comprises the same number of data blocks 22, while the main memory 14 comprises a plurality of memory banks, for example, banks (BANK#0, BANK#1, . . . , BANK#3) 23-0, 23-1, . . . , 23-3. When a central processing unit (see the CPUs of FIG. 1) wants to access a desired one of the data blocks to be located in, for example, the data set 21-1 of the intermediate buffer memory 13, and if the desired data block is not found in the data set 21-1, the desired data block must be removed-in from the main memory 14. In this case, one of the data blocks, for example, the data block 22' is moved-out, via a line pathway 24, to the corresponding main memory bank, for example the bank 23-0, so as to create an intermediate buffer memory space, in the data set 21-1, for accomodating the desired data block stored in the main memory 14. Usually, the data block 22' to be moved-out is a data block which is not used frequently by any of the CPUs. As mentioned above, the data block 22' to be moved-out is sent to the bank 23-0, because this bank 23-0 includes a set which is identical to the set 21-1 of the intermediate buffer memory 13. Then the desired data block to the moved-in is sent, via a line or pathway 25, from, for example the bank 23-2 to the intermediate buffer memory space where the old data block 22' was located, because this bank 23-2 includes the set which contains the data block to be moved-in. Thus, the CPU can access the desired data block in the intermediate buffer memory 13. As seen from FIG. 2, usually, the move-out operation and the corresponding move-in operation are not conducted in the same memory banks, but in two different banks, such as 23-0 and 23-2, and the operations use two different pathways. If it can be guaranteed that each pair of the move-in and move-out operations will be conducted in the same banks, the process for achieving management of the main memory 14 can be simplified and the access time may be considerably reduced. The reason for the simplification and reduction will be clarified with reference to FIGS. 3A and 3B. FIG. 3A depicts timing charts used for explaining the sequence in the prior art used for conducting successive pairs of the move-out and move-in operations, while, FIG. 3B depicts timing charts used for explaining the sequence in the present invention used for conducting successive pairs of the move-out and move-in operations. When each of the banks 23-0 through 23-3 can operate independently, there exists four pathways, that is the o-pathway, the 1-pathway, the 2-pathway and the 3-pathway, in the main memory 14. Suppose that both the memory banks 23-0 and 23-1 can operate, as one body, independently and also both the banks 23-2 and 23-3 can operate, as one body, independently; there then exists two pathways, i.e. the 0-pathway (23-0, 23-1) and 1-pathway (23-2, 23-3) in the memory 14. In FIGS. 3A and 3B, the indications 0-WAY through 3-WAY represent the above mentioned pathways 0-way through 3-way. As seen from FIG. 3A, the move-out operation and the move-in operation in each of the steps 1 , 2 , 3 and so on, are conducted in two different pathways, for example, the step 1 employs the 2-WAY and the 0-WAY, the step 2 the employs the 1-WAY and the 0-WAY, and the step 3 employs the 0-WAY and 1-WAY. Accordingly, the steps must be shifted in phase so as to avoid the occurrence of a conflict between the steps which employ the same pathway at the same time. It should be understood that both the move-out and move-in operations cannot be conducted, simultaneously, in the same pathway. As a result, it takes a relatively long time (see T in FIG. 3A) to complete the successive steps (1), (2) and 3 . Thus, as previously mentioned, the operating (accessing) speed of the main memory 14 cannot be increased, and, further, it is necesssary to introduce a particular protocol, in the system, for performing the traffic control between the conflicting steps.

However, in the present invention, both the move-out and move-in operations in each of the steps (1), (2), (3) and so on, are conducted in the same pathway, for example, the steps (1), (2) and (3) employ the 2-WAY, 1-WAY and 0-WAY, respectively. As a result, it takes a relatively short time (see t in FIG. 3B) to complete the successive steps (1), (2) and (3). Thus, a high operating (accessing) speed for the main memory 14 can be obtained and further the above mentioned particular protocol, for avoiding the conflict between the steps, is not necessary.

The reason why such an overlapping sequence, as shown in FIG. 3B, can be realized, will be explained in detail hereinafter. Generally speaking, according to the present invention, the address bits which are contained in the address information and used for specifying the desired one of the banks and pathways, are set up so as to partially incorporate therein a part of the address bits which are contained in the same address information and used for specifying one of the sets defined by the set associative method.

FIG. 4 depicts a conventional data format for the address information to be provided by either one of the CPUs when the CPU raises a request for accessing the intermediate buffer memory 13. The reference numeral 41 represents the address information composed of, for example, a 0 bit through a 31st bit. The address information contains first address bits 42, comprising the 6th bit through the 10th bit, and second address bits 43, comprising the 16th bit through the 25th bit. The first address bits 42 specify one of the memory banks or pathways in the main memory 14. The second address bits 43 specify one of the data sets predetermined according to the set associative method. Accordingly, the first address bits 42 may be called bank-selection address bits, and the second address bits 43 may be called set-selection address bits. In the present invention, the bank-selection address bits 42 include a part of the set-selection address bits 43, so that both the move-out and move-in operations in each step can be conducted in the same memory bank and pathway. Briefly speaking, if the bank-selection bits 42, comprising the 6th ((6)), 7th ((7)), 8th ((8)) and 9th ((9)) bits (10th bit is not used here), the lowest bit, that is 9th ((9)) bit, is modified in the following manner by using the last one or two bits of the set-selection-bits 43, that is the 24th bit (24) or 24th (24) and 25th (25) bits. In a case where the main memory 14 is built in a 1-pathway interleave mode, the bank-selection address bits are composed of ((6), (7), (8), (9)). In this case, the 9th bit (9) is not modified. However, in a case where the main memory 14 is built in a 2-pathway interleave mode, the bank-selection address bits are modified to be ((6), (7), (8), (25)) by introducing the bit of the set-selection address bits therein. Therefore, either one of the two pathways (2-way) is determined in accordance with the logic "1" or "0" of the bit (25). According to the set associative method, since the data set in which the data block to be moved-out is stored, is the same as the data set in which the data block to be moved-in is stored, the binary logic of the bit (25) regarding the move-out operation is always the same as the logic thereof regarding the move-in operation. Consequently, both move-out and move-in operations are conducted in the same pathway (bank) among the two pathways, defined by the logic "1" or "0" of the bit (25).

In a case where the memory 14 is built in a 4-pathway interleave mode, the bank-selection address bits are modified to be ((6), (7), (24), (25)) by introducing the bits of the set-selection address bits therein. Therefore, any one of the four pathways (4-way) is determined in accordance with one of the logics ("0", "0"), ("0", "1"), ("1", "0") and ("1", "1") of the bits (24) and (25). As explained above, according to the set associative method, since both the data block to be moved-out and the data block to be moved-in are always located in the same set, the binary logic of the bits (24) and (25) regarding the move-out operation are always the same as the logic thereof regarding the move-in operation. Consequently, both the move-out and move-in operations in each step are always conducted in the same pathway (bank).

As mentioned above, the bank-selection address bits are determined so as to reflect therein a bit information from the set-selection address bits. Specifically, when the main memory 14 is constructed in a $2^m$-pathway interleave mode, m bits of the bank-selection address bits are modified or substituted for by m bits from the set-selection address bits. Then number m is determined so as to make the number M to be a positive integer, where M is defined by an expression of $$M = B/2^m$$

where the B indicates the number of memory banks comprising the main memory 14. Preferably, said m bits of the set-selection address bits are chosen from the lower order bits thereof, and said m bits of the bank-selection-address bits are also chosen from the lower order bits thereof. This is because such lower order bits are very liable to be changed for various kinds of data blocks. The above mentioned expression, that is $$M = B/2^m,$$

will be clarified with reference to the following Table 1.

TABLE 1

| No. | B | INTERLEAVE MODES | | | | m |
|---|---|---|---|---|---|---|
| No. 1 | 1 | 1BANK × 1(2⁰)WAY | | | | 0 |
| No. 2 | 2 | 2BANK × 1(2⁰)WAY | 1BANK × 2(2¹)WAY | | | 0,1 |
| No. 3 | 3 | 3BANK × 1(2⁰)WAY | | | | 0 |
| No. 4 | 4 | 4BANK × 1(2⁰)WAY | 2BANK × 2(2¹)WAY | 1BANK × 4(2²)WAY | | 0,1,2 |
| No. 5 | 5 | 5BANK × 1(2⁰)WAY | | | | 0 |
| No. 6 | 6 | 6BANK × 1(2⁰)WAY | 3BANK × 2(2¹)WAY | | | 0,1 |
| No. 7 | 7 | 7BANK × 1(2⁰)WAY | | | | 0 |
| No. 8 | 8 | 8BANK × 1(2⁰)WAY | 4BANK × 2(2¹)WAY | 2BANK × 4(2²)WAY | 1BANK × 8(2³)WAY | 0,1,2,3 |

In the above recited Table 1, columns respectively represent the number of banks (B), the interleave modes (INTERLEAVE MODES) and the number m; and rows respectively classify respective cases No. 1 through No. 8. The case No. 4 corresponds to the construction of the main memory 14 shown in FIG. 2. The interleave modes of the Table 1 will be clarified with reference to FIGS. 5A, 5B, and 5C. FIGS. 5A, 5B and 5C illustrate the construction of the main memory 14 which is built, respectively, in the interleave modes of (4 BANK×1 pathway), (2 BANK×2 pathway) and (1 BANK×4 pathway), corresponding to the case No. 4 of the Table 1. When the main memory 14 is constructed in the interleave mode of the (4 BANK×1 pathway), as shown in FIG. 5A, the number m is selected to be 0 (m=0). when the main memory 14 is constructed in the interleave mode of the (2 BANK×2 WAY pathway), the number m is selected to be 1 (m=1). When the main memory 14 is constructed in the interleave mode of the (1 BANK×4 pathway), the number m is selected to be 2 (m=2). In FIGS. 5A, 5B and 5C, the areas 51 through 57 represent the pathways and banks respectively. It should be noted that each pathway and bank can operate independently. Accordingly, in FIG. 5A, only one move-out or more-on operation can be conducted in the banks 23-0 through 23-3 at any one time; in FIG. 5B, one move-out or more-in operation can be conducted in both the banks 23-0, 23-1 (being enclosed by the pathway and bank divider 52) and at the same time another move-out or move-in operation can be conducted in both the banks 23-2, 23-3 (being enclosed by the pathway and bank divide 53); and in FIG. 5C, respective move-out or move-in operation can be conducted simultaneously in each of the banks, the bank 23-0 (pathway 54), the bank 23-1 (pathway 55), the bank 23-2 (pathway 56) and the bank 23-3 (pathway 57). In these figures, each of the banks has the same capacity of data blocks.

When m=1, one of the bank-selection address bits (42) can be modified by one of the set-selection address bits (43). In this case, if the logic of the previously mentioned bit ㉕ is "0", regarding one data block, the move-out and move-in operatitons can be conducted successively in the same pathway and bank 52. At the same time, if the logic of the previously mentioned bit ㉕ is "1", regarding another data block, the move-out and move-in operations can be conducted successively in the same pathway and bank 53. When m=2, two of the bank-selection address bits (42) can be modified by two of the set-selection address bits (43). In this case, since there are four (2²) independent pathways, respective move-in or move-out operations can be conducted simultaneously in the pathways and banks 54 through 57, respectively. Consequently, the sequence of the move-out and move-in operations, such as shown in FIG. 3B, can be obtained.

When the number (B) of banks is an odd number, such as 1, 3, 5 or 7, it is impossible to divide the main memory 14 into two or more pathways, as each of the pathways must access or have the same number of banks. Accordingly, in such cases as the Nos. 1, 3, 5 and 7, the main memory 14 is constructed in the single interleave mode, similar to the mode shown in FIG. 5A. Therefore, in such cases, the present invention is not effective.

As previously mentioned, the number m of bits to be entered into the bank-selection address bits from the set-selection address bits, is defined by the expression $M = B/2^m$. In detail, it is preferable that the number m is determined by the following expression.

$$m = \max\left( x : \frac{B}{2^x} = M \right) \quad (1)$$

This expression means that the number m should be selected so as to get a maximum value for the integer x, where the integer x should satisfy the condition $$\frac{B}{2^x} = M.$$

The symbols B and M indicate the number of memory banks and a positive integer, respectively. With reference again to FIGS. 5A, 5B and 5C, and the above recited expression (1)

$$m = \max\left( x : \frac{B}{2^x} = M \right).$$

when the number of memory banks B equals 4, there exists three positive integers M, that is 4 (=4/2⁰: corresponding to FIG. 5A), 2 (=4/2¹: corresponding to FIG. 5B) and 1 (=4/2²: corresponding to FIG. 5C). Therefore, there exists three integers x, that is 0, 1 and 2. Among these three integers 0, 1 and 2, the maximum value of x equals 2. Thus, it is preferable that the number m is selected to be 2, according to the above recited expression.

However, the above recited expression $$m = \max\left( x : \frac{B}{2^x} = M \right)$$

is useful only when each of the memory banks has the same capacity of data blocks. If each of the memory banks does not have the same capacity of data blocks, the expression (1) is not applicable, but instead, the following expression is applicable.

$$m = \min\left\{ 2x, y: \frac{B}{2^x} = Mx, \frac{\left(\frac{U}{u}\right)}{2^y} = My \right\} \quad (2)$$

This equation means that the number m should be selected as a minimum value among x and y, where the integer x is a maximum value which satisfies the condition, that is $$\frac{B}{2^x} = Mx$$

(Mx is a positive integer), and the integer y is a maximum value which satisfies the condition, that is $$\frac{\left(\frac{U}{u}\right)}{2^y} = My$$

Figure 6:
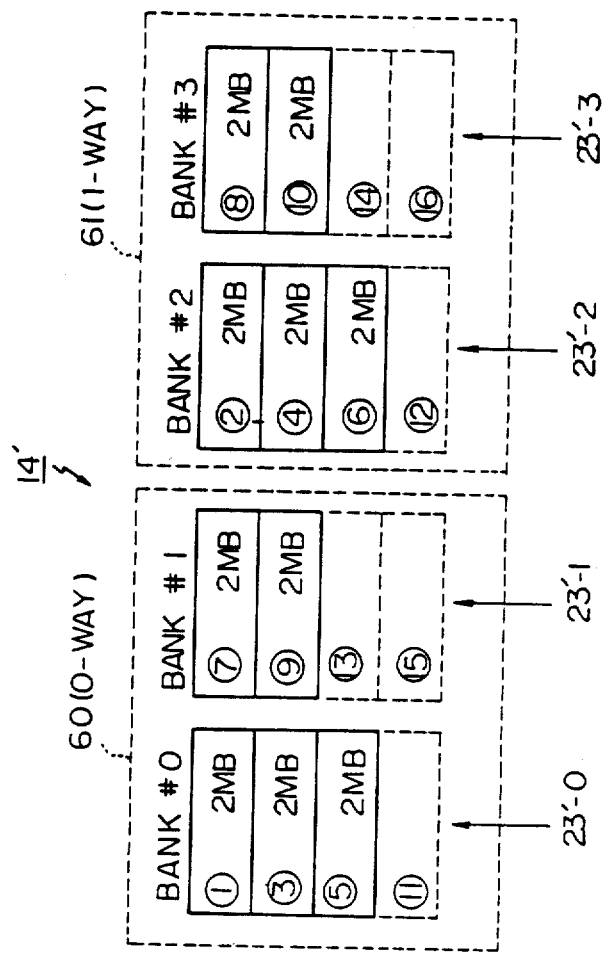
FIG. 6 illustrates another example of a construction of the main memory 14 shown in FIG. 2.

(My is a positive integer), the symbol U indicates total memory capacity of all the units comprising all the banks and the symbol u indicates memory capacity of a single one of the units comprising each memory bank. The meanings of the above recited expression (2) will be clarified with reference to FIG. 6 and the following Table II. In FIG. 6, main memory banks 23'-0 through 23'-3 correspond to the aforesaid banks 23-0 through 23-3, respectively. However, these memory banks do not have the same capacity of data blocks, as do the aforesaid banks 23-0 through 23-3. For example, the banks 23'-0 through 23'-3 have the capacities of 6 MB (Mega Byte), 4 MB, 6 MB and 4 MB, respectively, where the capacity of one of the units comprising each bank is 2 MB. The numerals ①through ⑩ represent respective physical or real units of the memory banks. The numerals ⑪ through ⑯ represent respective imaginary units of the banks, which units are not actually existence. As seen from FIG. 6, the total real capacity of the units, are 20 MB, that is U=20; the capacity of each unit is 2 MB, that is u=2; and the number B of main memory banks is 4, that is B=4. Taking these numbers into consideration, in the expression (2), the integer x is determined to be 2, where the condition $$\frac{B}{2^x} = Mx$$

is specifically expressed by $$\frac{4}{2^2} = 1,$$

and the integer y is determined to be 1, where the condition $$\frac{\left(\frac{U}{u}\right)}{2^y} = My$$

is specifically expressed by $$\frac{\left(\frac{20}{2}\right)}{2^1} = 5.$$

Accordingly, the number $m = \min\{x, y\}$, that is $m = \min\{2, 1\}$, is determined to be 1. As a result, the main memory 14' of FIG. 6 is constructed in a $2(2^m = 2^1)$ pathway interleave mode. The reference numerals 60 and 61, in FIG. 6, represent a 0-way and a 1-way, respectively. Accordingly, the banks 23'-0 and 23'-1 are alloted to the 0-pathway 60, and the banks 23'-2 and 23'-3 are alloted to the 1-pathway 61. Allocations of the units ① through ⑩ shown in FIG. 6 will be clarified with reference to the following Table II.

TABLE II

| UNIT No. | BANK-SELECTION ADDRESS BITS | | | | BANK No. | PATH-WAY No. |
|---|---|---|---|---|---|---|
| | ⑦ | ⑧ | ⑨ | ㉕ | | |
| ① | "0" | "0" | "0" | "0" | 0 | 0 |
| ② | "0" | "0" | "0" | "1" | 1 | 1 |
| ③ | "0" | "0" | "1" | "0" | 0 | 0 |
| ④ | "0" | "0" | "1" | "1" | 1 | 1 |
| ⑤ | "0" | "1" | "0" | "0" | 0 | 0 |
| ⑥ | "0" | "1" | "0" | "1" | 1 | 1 |
| ⑦ | "0" | "1" | "1" | "0" | 2 | 0 |
| ⑧ | "0" | "1" | "1" | "1" | 3 | 1 |
| ⑨ | "1" | "0" | "0" | "0" | 2 | 0 |
| ⑩ | "1" | "0" | "0" | "1" | 3 | 1 |
| ⑪ | "1" | "0" | "1" | "0" | Non existant | " |
| ⑫ | "1" | "0" | "1" | "1" | " | " |
| ⑬ | "1" | "1" | "0" | "0" | " | " |
| ⑭ | "1" | "1" | "0" | "1" | " | " |
| ⑮ | "1" | "1" | "1" | "0" | " | " |
| ⑯ | "1" | "1" | "1" | "1" | " | " |

In the above recited Table II, the numbers of units column (UNIT No.) indicates the units ① through ⑯ of FIG. 6; the bank numbers columns (BANK No.) indicates the banks 0, 1, 2 and 3, respectively, representing the banks 23'-0 through 23'-3 of FIG. 6' and pathway number column (pathway No.) indicates the pathway 0 and 1 representing the 0-pathway 60 and 1-pathway 61 of FIG. 6. The bank-selection address bits ⑦, ⑧ and ⑨ correspond to the address area 42 of FIG. 4. The bit ㉕ is entered into the bank-selection address bits from the set-selection address bits 43 of FIG. 4. The symbols "0" and "1" in Table II indicate the logic of the bits. As seen from Table II, one move-out or move-in operation regarding one data block to be replaced and another move-out or move-in operation regarding another data block to be replaced can be conducted simultaneously, in the 0-pathway (60) and 1-pathway (61), respectively. The 0-pathway and the 1-pathway are specififed by the logics "0" and "1" of the bit ㉕ , respectively. In this case, one data block belongs to one data set having, at its lowest bit ㉕ , the logic "0", and said another data block belongs to another data set having, at its lowest bit ㉕ , the logic "1".

Figure 7:
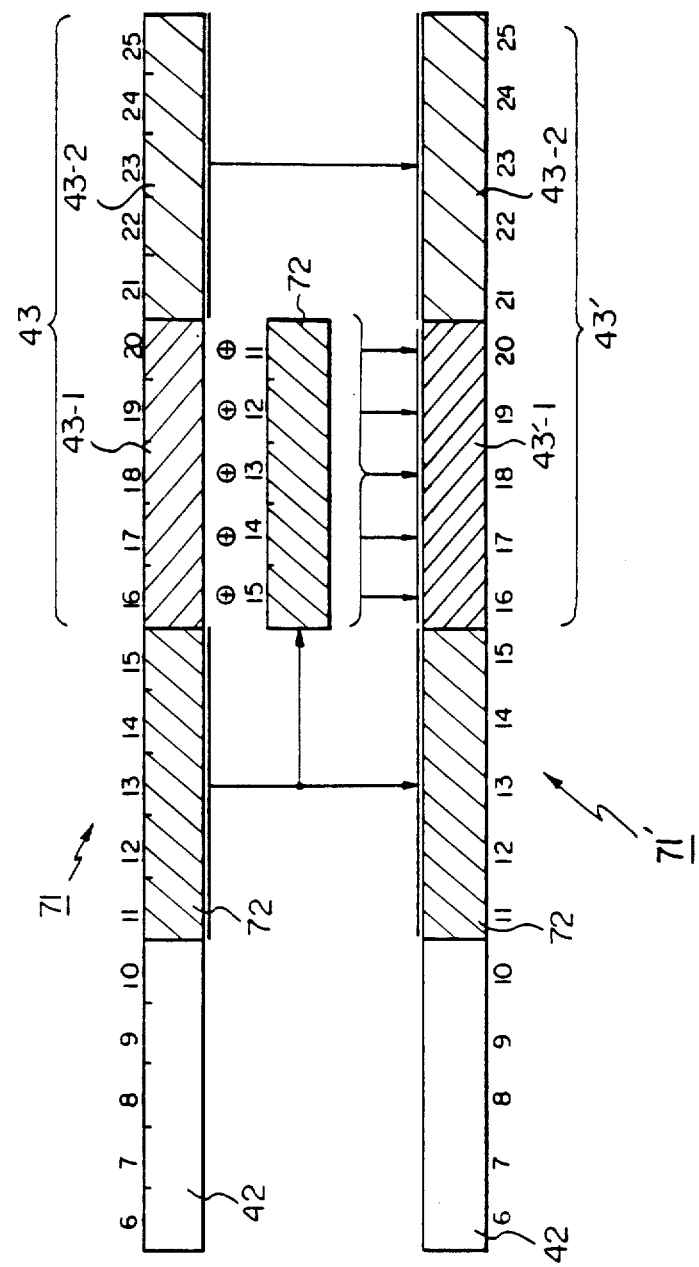
FIG. 7 depicts data formats of address information, used for explaining a so-called hashing operation.

It is required, in the intermediate buffer memory 13 (FIG. 2), that all the data sets 21-0 through 31-k be used uniformly. In other words, these data sets must be accessed by the CPU at random. As widely known, for the purpose of satisfying the above mentioned requirement, a so-called hashing operation is often performed in the system. FIG. 7 depicts a data format of the address information to which no hashing operation is applied, and also depicts a data format of the address information to which the hashing operation is applied. Therefore, the address information 71 is substantially the same as the address information 41 of FIG. 4. The data format (71) includes the aforesaid bank-selection address bits 42 and the set-selection address bits 43. The address information 71' is obtained through the hashing operation. The original information 71 comprises means areas 42, 72, 43-1 and 43-2. While, the hashed information 71' comprises address areas 42, 72, 43'-1 and 43-2. Especially, the address areas 72, 43-1 (43'-1) and 43-2 specify the address of the intermediate buffer memory 13 (FIGS. 1 and 2). The cross hatched area 43'-1 is produced as the result of an EOR (Exclusive OR) operation between the area 43-1 and the area 72. The symbols $\oplus$ indicate the EOR operation, bit-by-bit, between the areas 43-1 and 72.

If the dashed address information 71' is applied to the intermediate buffer memory 13, the above-mentioned m bits, which are entered from the set-selection address bits 43' to the bank-selection address bits 42, must not be chosen from the area 43'-1 but from the area 43-2. This is because the area 43'-1 does not contain the correct set-selection address bits, and accordingly, the correct allocation of the pathways, as represented in the above recited Table II, cannot be performed. It should be noted that the correct set-selection address bits are defined only by the two areas 43-1 and 43-2. Therefore, the above mentioned m bits should be chosen from the area 43-2 of the information 71'.

Figure 8A:
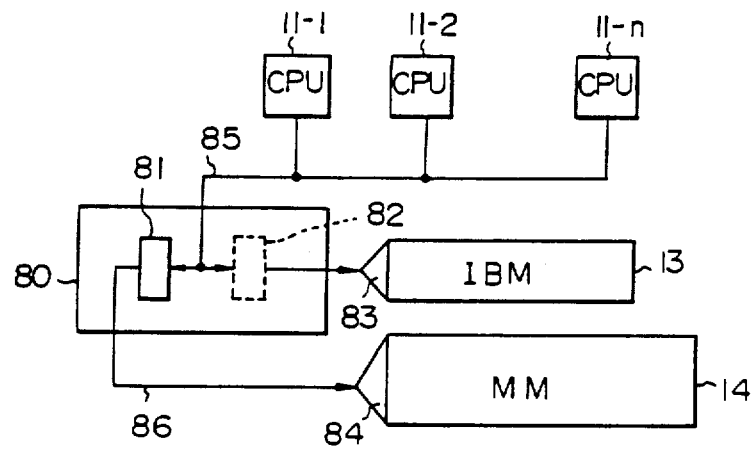
FIG. 8A illustrates an example of a data processing system, according to the present invention, which includes a memory access controller.
Figure 8B:
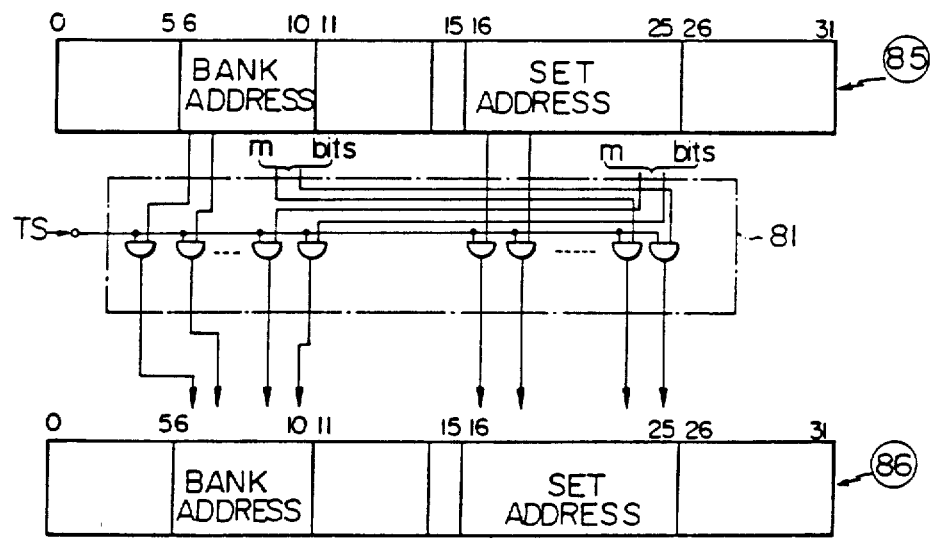
FIG. 8B illustrates an example of a gate means 81 shown in FIG. 8A.

FIG. 8A illustrates an example of a data processing system, according to the present invention, which includes a memory access controller. The members or elements, which have the same reference numerals and symbols as those indicated in FIG. 1, are identical to each other. The reference numeral 80 represents the memory access controller. The controller 80 includes gate means 81 and means, 82, for carrying out the hashing operation. Means 82 is included therein, if necessary. The reference numerals 83 and 84 represent decoders. One example of gate means 81 of FIG. 8A is illustrated in FIG. 8B. As seen from FIG. 8B, the m bits of the set-selection address bits are entered into the bank-selection address bits, via respective AND gates. The AND gates are caused to open or close synchronous with a timing signal TS. The address information 85 is transmitted on a bus 85 shown in FIG. 8A and the address information 86 is transmitted on a bus 86 shown in FIG. 8A.

As explained above, according to the present invention, the process for achieving the management of the main memory can be simplified, and, further, the operating (accessing) speed of the main memory can be increased.

We claim:

1. A data processing system having hierarchial memories, comprising:
   a plurality of central processing units each having buffer memories;
   an intermediate buffer memory, operatively connected to said central processing units for storing data in sets of the data blocks; including at least two data set storage areas each containing at least two data block storage areas;
   a main memory operatively connected to said intermediate buffer memory divided into a plurality of banks and the banks being divided into data blocks which are the units accessed by said central processing units, including first and second data bank storage areas each having a data block storage area, when a needed data block is in the first data bank storage area an unneeeded data block in one of said intermediate buffer block memory data block storage areas is moved into the first data bank storage area and the needed data block is moved form the first data bank bank storage area into the one of said intermediate buffer memory data block storage areas replacing the unneeded data block by addressing said main memory with bank selection data in which a part of the set address portion is substituted for a part of the bank selection data, the needed and unneeded data blocks each belonging to the same data bank storage areas, so that the data blocks are moved into and out of the same data bank storage area;

move-out and move-in operations for a needed data block, between said intermediate buffer memory and said main memory, being achieved under a swap control metod, and said main memory and intermediate buffer memory are both controlled under a set associative method;

said main memory being accessed under an interleave control method; and said main memory and said intermediate buffer memory being accessed by address information which includes both bank-selection address bits, for specifying any one of said and set-selection address bits for specifying said data block to be moved-out and moved-in, and the bank-selection address bits being partially modified by a part of the set-selection address in such a manner as to access said memory in a $2^m$-pathway interleave control mode, the symbol m being an integer representing the number of bits of said bank-selection address bits substituted for by said set-selection address bits, the number m as being defined by the expression $$B/2^m = M.$$

where the symbol B is an integer which indicates the number of said banks in said main memory and the symbol M is a positive integer indicating the number of banks that can be integer divisible by $2^m$-pathways.

2. A system as set forth in claim 1, wherein the number m is determined by an expression $$m = \max\left\{ x: \frac{B}{2^x} = M \right\}$$

where the number m is a maximum value of the integer x and the number x satisfies the condition of $$\frac{B}{2^x} = M.$$

where x specifies the maximum number of bits that can be substituted and maintain a $2^m$-pathway interleave control mode using B banks.

3. A system as set forth in claim 1,
   wherein said banks comprise physical memory units; and
   wherein the number m is determined by an expression $$m = \min\left\{ x, y: \frac{B}{2^x} = Mx, \frac{\left(\frac{U}{u}\right)}{2^y} = My \right\}$$

where the number m is a minimum value chosen from the integer numbers x and y, indicating the number of banks that can be integer divisible by $2^m$-pathways, the integer x is a maximum value which satisfies a condition $$\frac{B}{2^x} = Mx,$$

where B is the number of said banks, Mx is a positive integer indicating the number of banks B that can be integer divisible by $2^m$-pathways, and x specifies the maximum number of bits that can be substituted and maintain a $2^m$-pathway interleave control mode using B banks, the integer y is a maximum value which satisfies a condition $$\frac{\left(\frac{U}{u}\right)}{2^y} = My.$$

where U indicates a total memory capacity of said main memory, u indicates a memory capacity of one of the physical memory units comprising each of said banks where the physical memory units have uniform capacity, My is a positive integer indicating the number of physical memory units that can be integer divisible by $2^m$-pathways, and y indicates the number of bits that can be substituted when the total main memory capacity is U, the capacity of one of the physical memory units is u and maintain a $2^m$-pathway interleave control mode.

4. A system as set forth in claim 1, wherein said bank-selection address bits are substituted for by one or more bits of said set-selection address bits.

5. A system as set forth in claim 1, wherein when said set-selection address bits are partially modified through a hashing operation, said bank-selection address bits are partially modified by non-hashed bits of the set-selection address bits.

6. A data processing system having hierarchial memories, comprising:
   a central processing unit producing a memory access demand address having a set address portion;
   an intermediate buffer memory, operatively connected to said central processing unit, including at least two data set storage areas each containing at least two data block storage areas; and
   a main memory, operatively connected to said intermediate buffer memory, including first and second data bank storage areas each having a data block storage area, when a needed data block is in the first data bank storage area an unneeded data block in one of said intermediate buffer memory data block storage areas is moved into the first data bank storage area and the needed data block is moved from the first data bank storage area into the one of said intermediate buffer memory data block storage areas replacing the unneeded data block by addressing said main memory with bank selection data in which a part of the set address portion is substituted for a part of the bank selection data, the needed and unneeded data blocks each belonging to the same data bank storage means, so that the data blocks are moved into and out of the same data bank storage area.

7. A data processing system as set forth in claim 6, wherein each of said bank selection data and said set address portion contain bits;
wherein each of said data bank storage areas comprise physical memory units;
wherein m bits of said bank selection data are substituted for by m bits from said set address portion according to $$m = \min\left\{ x, y: \frac{B}{2^x} = Mx, \frac{\left(\frac{U}{u}\right)}{2^y} = My \right\}$$

where m is an integer indicating the number of bits substituted and is the minimum of x and y, B is the number of bank storage areas, x is the maximum value which satisfies the respective equation and indicates the maximum number of bits that can be substituted and maintain a $2^m$-pathway interleave control mode using B banks, Mx is a positive integer indicating the number of bank storage areas B that can be integer divisible by $2^x$-pathways, U is a total memory capacity of said main memory, u is a memory capacity of one of the physical memory units comprising one of the data bank storage areas where the physical memory units have uniform capacity, My is a positive integer indicating the number of physical memory units that can be integer divisible by $2^m$-pathways, and y is the maximum integer satisfying the respective equation and indicates the number of bits that can be substituted when the total main memory capacity is U, the capacity of the physical memory units is u and maintain a $2^m$pathway interleave control mode.

8. A data processing system as set forth in claim 7, further comprising a memory access controller operatively connected to said central processing unit, said intermediate buffer memory and said main memory for managing access to said intermediate buffer memory by said CPU and controlling input/output processing between said main memory and said intermediate buffer memory.

* * * * *

UNITED STATES PATENT AND TRADEMARK OFFICE
CERTIFICATE OF CORRECTION

PATENT NO. : 4,550,367

DATED : October 29, 1985

INVENTOR(S) : AKIRA HATTORI ET AL.

It is certified that error appears in the above-identified patent and that said Letters Patent is hereby corrected as shown below:

Col. 2,  line 21, after "the" insert —data—;

line 22, delete "data".

Col. 3,  line 42, change "in to" to —into—;

line 59, change "up date" to —update—;

line 68, "Cash" should be —Cache—.

Col. 4,  line 6, delete "main";

line 7, before "memory" insert —main—;

line 34, after "line" insert —or—;

line 64, "tions," should be —tions;—.

Col. 5,  line 1, "o-" should be — 0- —;

line 12, "1, 2, 3" should be —①, ②, ③—;

line 14, "1" should be —①—;

line 15, "2" should be —②—;

line 16, "3" should be —③—;

after "and" insert —the—;

UNITED STATES PATENT AND TRADEMARK OFFICE
CERTIFICATE OF CORRECTION

PATENT NO. : 4,550,367

DATED : October 29, 1985

INVENTOR(S) : AKIRA HATTORI ET AL.

It is certified that error appears in the above-identified patent and that said Letters Patent is hereby corrected as shown below:

Col. 5, line 46, delete "partially".

Col. 6, line 22, delete "the" (first occurrence);

line 45, delete "a".

Col. 9, in the equation "$\frac{B}{x}$" should be --$\frac{B}{2x}$--.

Col. 10, line 11, "-way" should be --pathway-- (both occurrences);

Col. 11, line 18, "dashed" should be --hashed--.

Signed and Sealed this

Sixteenth Day of September 1986

[SEAL]

Attest:

DONALD J. QUIGG

Attesting Officer

Commissioner of Patents and Trademarks